United States Patent [19]

Milz

[11] 4,352,587

[45] Oct. 5, 1982

[54] LOCKING ASSEMBLY FOR STRUCTURAL PRODUCTS

[76] Inventor: Frederick Milz, 6002 Westbury Ave., Montreal, Quebec, Canada, H3W 2W9

[21] Appl. No.: 167,208

[22] Filed: Jul. 9, 1980

[30] Foreign Application Priority Data

Jul. 9, 1979 [CA] Canada .................................. 331374

[51] Int. Cl.³ .............................................. F16B 7/22
[52] U.S. Cl. .................................. 403/252; 403/316; 211/192
[58] Field of Search ............. 403/252, 230, 231, 217, 403/218, 256, 254, 255, 253, 264, 316, 317; 211/192

[56] References Cited

U.S. PATENT DOCUMENTS

| 2,972,395 | 2/1961 | Peremi | 403/231 |
| 3,563,581 | 2/1971 | Sommerstein | 403/217 |
| 3,747,965 | 7/1973 | Wing | 403/252 X |
| 4,063,835 | 12/1977 | Husband | 403/252 |

FOREIGN PATENT DOCUMENTS 1415651 11/1975 United Kingdom ............... 403/218

Primary Examiner—Andrew V. Kundrat

[57] ABSTRACT

A construction for use in knockdown structures comprising a tubular leg, a cross-bar, and a locking member. The tubular leg has an anchoring member fixed within it adjacent one end. At least one slot is provided in the wall of the leg between the anchoring member and the one end. The cross-bar has a tab that slides into the slot and hooks onto the wall of leg. The locking member cooperates with the anchor member to hold the tab, and thus the cross-bar, in hooked position.

9 Claims, 16 Drawing Figures

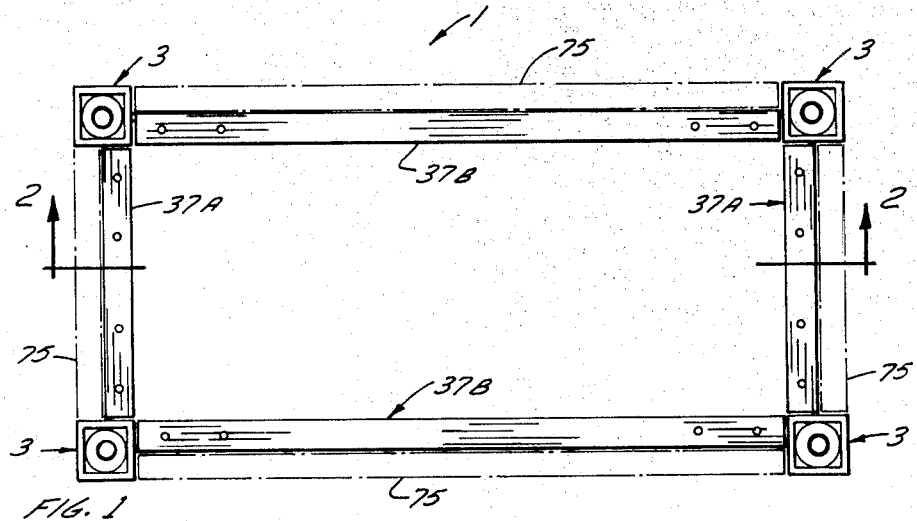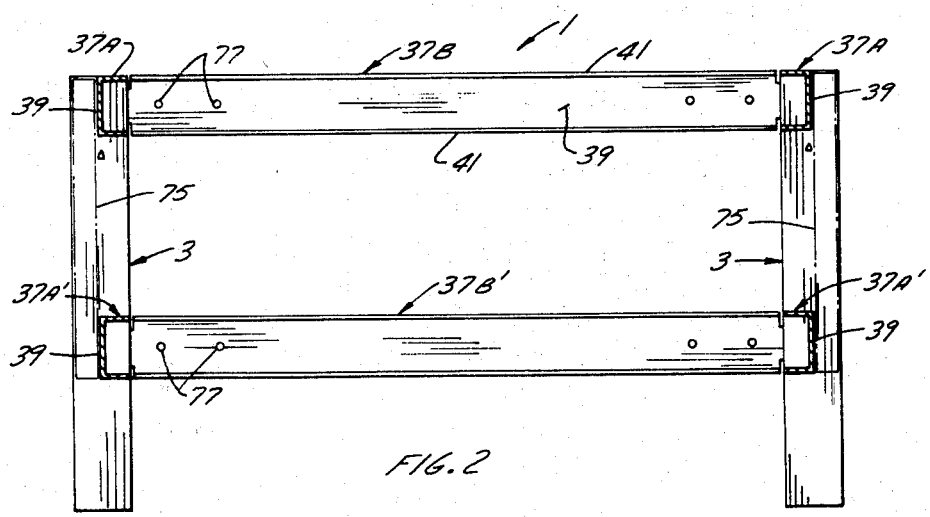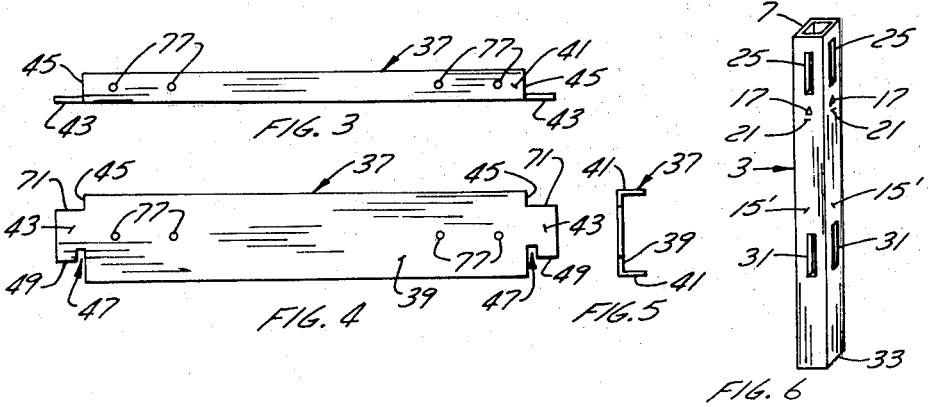

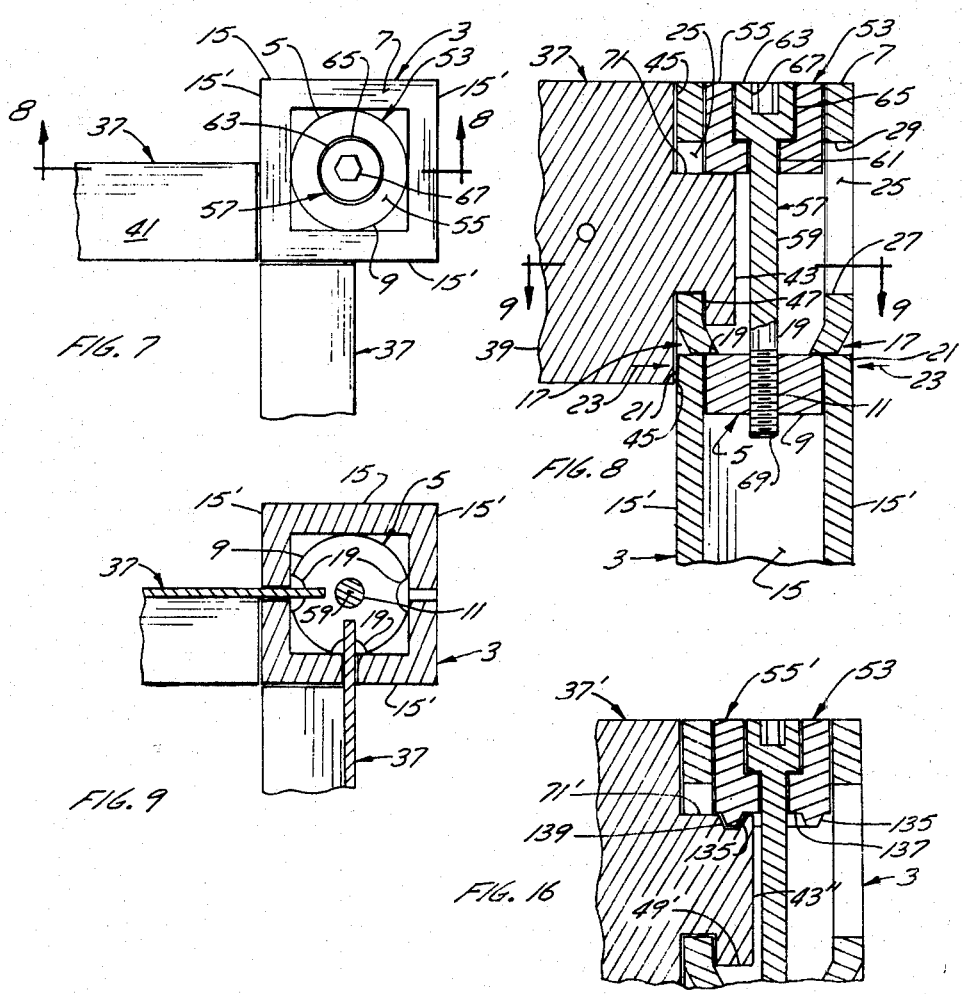

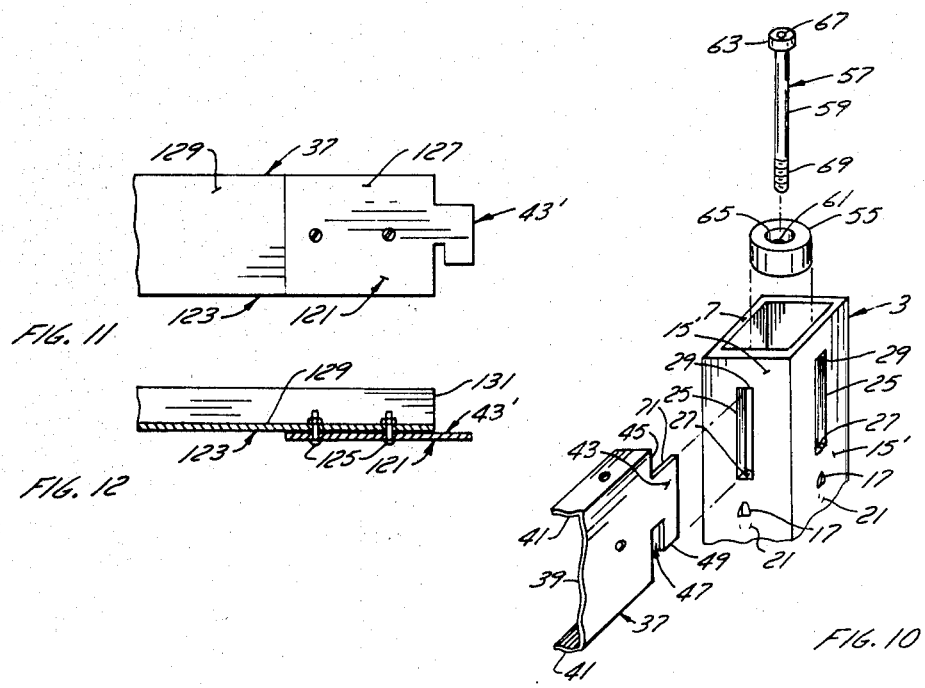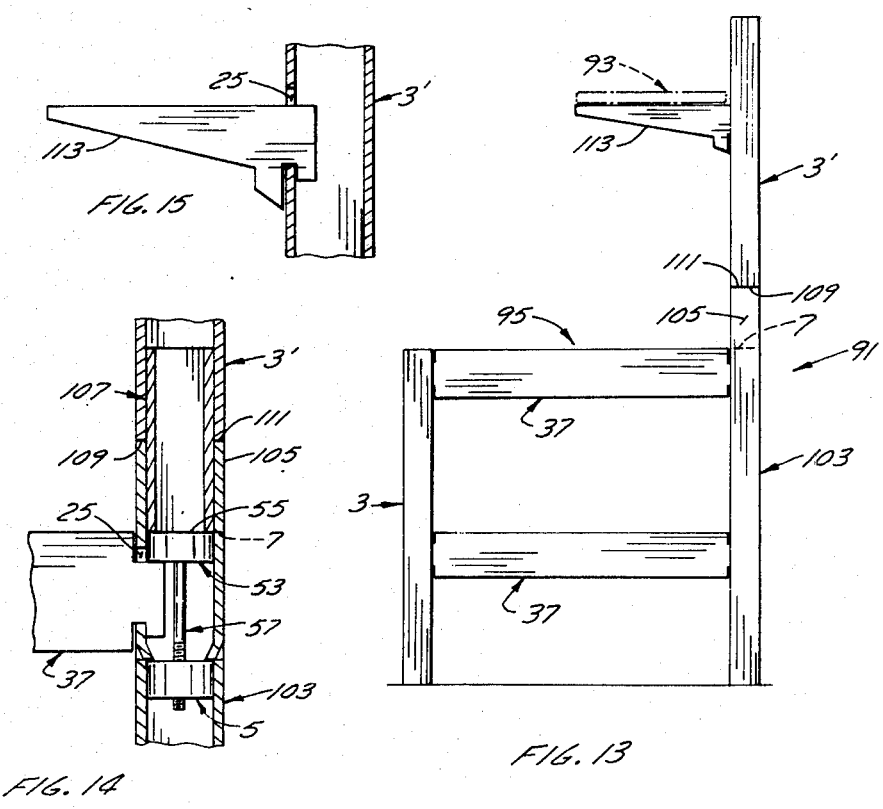

LOCKING ASSEMBLY FOR STRUCTURAL PRODUCTS

This invention is directed toward construction for use in knockdown structures.

The invention is more particularly directed toward modular structural units, and their connection together, for use in constructing knockdown structures.

It is desirable to provide structures which are very versatile such as tables, work benches, storage units, etc. which can be easily erected or dismantled; the structures are also suitable for framework for industrial cabinets, to house electrical and hydraulic or other like components and to serve as machine stands and bases, tower-like structures and merchandise display stands, etc. Such structures can be easily stored in a small space when not needed, and easily transported. When new, or additional work space or storage area is needed, the structures can be set up as needed.

Many types of knockdown structures are known. Often however they have one or more disadvantages. Some types of knockdown structures have complex joints between the members which often require special tools to assemble the members. Other types of knockdown structures are not very sturdy when assembled and either require additional members for bracing, or cannot be used for heavy duty work. A major problem with most knockdown structures however is that they are limited as to use. Very few known structures employ modular structural units which can be used in a variety of ways. Thus versatility is unobtainable and different component assemblies must often be employed to provide structures having different uses. The large number of components needed to provide a variety of structures increases the cost of the structures. In addition, without modular units it is difficult to add on or enlarge existing structures.

It is therefore a purpose of the present invention to provide an improved construction for use in knockdown structures, which construction comprises a few simple modular structural units. The modular units are designed so that a variety of different structures can be erected or added on to. The modular units are constructed to be simply, yet strongly, joined together with simple tools. The structures erected from the units are rigid and sturdy and are capable of carrying heavy loads.

The invention is particularly directed toward a construction for use in knockdown structures comprising a tubular leg with an anchor member fixed within the leg near one end of the leg. At least one longitudinal slot is provided in the wall of the leg located between the anchor member and the one end of the leg, the slot spaced from the anchor member. The construction includes an elongated cross-bar having a tab extending from at least one end of the bar. The tab has a notch formed in one side of the tab, adjacent to the end of the bar. The cross bar is connected to the leg by sliding the tab through the slot until the end of the cross-bar abuts the wall of the leg. The cross-bar is then moved in a direction away from the one end of the leg to move the wall of the leg into the notch in the tab to prevent withdrawal of the cross-bar. Locking means are provided to prevent the cross-bar from being moved in a direction back toward the one end of the leg so the cross-bar can be withdrawn. The locking means are sized to fit within the one end of the tubular leg and attach to the anchor member while overlying the tab of the cross-bar to prevent its movement toward the one end of the leg.

The invention will now be described in detail having reference to the accompanying drawings in which:

FIG. 1 is a plan view of a knockdown table;

FIG. 2 is cross-section view of the table taken along line 2—2 of FIG. 1;

FIG. 3 is a plan view of a cross-bar used in the knockdown construction;

FIG. 4 is an elevation view of the cross-bar;

FIG. 5 is an end view of the cross-bar;

FIG. 6 is a perspective view of a tubular leg used in the knockdown construction;

FIG. 7 is a plan view of the connection between the cross-bar and leg;

FIG. 8 is a cross-section view of the connection taken along line 8—8 of FIG. 7;

FIG. 9 is a cross-section view taken along line 9—9 of FIG. 8;

FIG. 10 is an exploded perspective view of the connection;

FIG. 11 is a detail plan view of another form of cross-bar;

FIG. 12 is a detail cross-section view of the cross-bar shown in FIG. 11;

FIG. 13 is an end view of a knockdown work bench;

FIG. 14 is a detail cross-section view of the work bench;

FIG. 15 is another detail cross-section view of the work bench; and

FIG. 16 appearing on the same sheet as FIG. 7, is a view similar to FIG. 8 showing a modification of the locking means;

The knockdown structures of the present invention, such as the table 1 shown in FIGS. 1 and 2, are assembled from a few simple modular structural units which are easily joined together. One of the modular structural units is a tubular leg 3 as shown in FIG. 6. The tubular leg 3 preferably has a square cross-section. An anchor member 5 is mounted within the leg 3 near one open end 7 of the leg as shown in FIGS. 7 to 9. The anchor member 5 comprises a cylindrical plug 9 having a threaded axial through hole 11. The diameter of plug 9 is substantially the same as the width of the interior of the tubular leg 3. The plug 9 is fixed within the leg 3. The plug 9 is first located at the desired distance from the end 7 of leg 3, within the leg. The walls 15 of the leg 3 are then dimpled inwardly as shown by indentations 17 to lock the plug 9 in place. Preferably one indentation 17 is provided in each of three walls 15' of the four walls making up the tubular leg 3, the indentation 17 in each wall generally centrally located therein between the sides of the wall. One wall is left unindented to provide a clean appearance. This wall is usually faced outwardly when erecting a structure.

The dimpling produces inwardly projecting shoulders or tabs 19 which prevent the cylindrical plug 9 from being withdrawn from the leg. At the same time, the dimpling operation presses the wall area 21 adjacent the indentations 17 tight against the plug 9 as shown by arrows 23 in FIG. 8 to clamp the plug 9 in place.

Each tubular leg 3 has at least one longitudinal slot 25 in the wall. Preferably, each leg 3 has a first upper set of slots 25, one slot 25 of the first set in each wall 15' which has an indentation 17 therein. The bottom end 27 of slot 25 in each wall 15 is located a short distance above the indentation 17 in the wall and its top end 29 terminates just below the open end 7 of the tube. Each slot 25 is in the center of the wall between its sides. A second lower set of slots 31 can be provided in the leg 3, near the bottom end 33 of the leg as shown in FIG. 6. The lower set of slots 31 are located in the same walls as are the upper set of slots 25, and each lower slot 31 is in the center of its wall. Slots 25 and 31 have the same length and width.

A second modular structural unit for use in making the knockdown structures of the present invention is a cross-bar 37 shown in FIGS. 3 to 5. The cross-bar 37 preferably comprises a shallow, U-shaped channel member having a wide web 39 and short flanges 41 projecting from the sides of the web. A tab 43 projects from each end 45 of the web 39. As shown in FIGS. 3 to 5 each tab 43 can be formed integral with the web 39. A rectangular notch 47 is formed in each tab 43, extending into the tab 43 from one side 49 adjacent to end 45. The notch 47 has a width equal to the thickness of the walls 15 of the tubular leg.

The construction includes locking means 53, shown in FIGS. 7 to 10 for locking the cross-bars 37 and legs 3 together to form knockdown structures. Each locking means 53 is sized to fit within the leg 3 from its upper end 7. The locking means 53 has a cylindrical retainer 55, having a diameter just slightly less than the width of the interior of the leg 3. A bolt 57 is included in the locking means. The shank 59 of bolt 57 passes through a central bore 61 in retainer 55, the head 63 of the bolt 57 fitting snugly in a recess 65 in retainer 55 which is concentric with bore 61. A central wrench recess 67 is provided in the head 63 of the bolt and the bottom part 69 of the bolt shank 59 is threaded to screw into the hole 11 in the anchor member 5.

As shown in FIG. 7 to 10, each cross-bar 37 is connected to a leg 3 by inserting the tab 43 on the end of the cross-bar 37 through a slot 25. The cross-bar is perpendicular to the leg. The tab 43 on the cross-bar 37 is inserted far enough into the slot 25 to have the end 45 of the cross-bar 37 abut the wall 15' of the leg 3. The cross-bar 37 is then moved away from end 7 of leg 3 to relatively move the wall 15' of the leg, beneath the end 27 of slot 25 into the notch 47 as shown in FIG. 8. This now prevents the cross-bar from pulling away from the leg. In this position the top of the cross-bar is level with the top of the leg. The locking means 53 is now inserted into the open end 7 of the leg 3, the retainer 55 resting on top side 71 of the tab 43 to hold it in position within the leg while the bolt 57 is screwed into the anchor device 5. The bolt can be drawn very tight against the tab, via the retainer since the tabs 19 firmly hold the anchor plug 9 in place. The cross-bar 37 is now firmly locked in place to the leg 3, with its end 45 flush against the wall 15' of the leg. Since the cross-bar is relatively deep and since all of the end edges of the web and flanges bear flat against the flat wall of the leg, the bar-leg connection is very stable. Other than a suitable bolt wrench, such as an Allen wrench for example, no other tools are needed to make the connection between a cross-bar and a leg. Each leg 3 can be made in two or more standard lengths. Each cross-bar can also be made in two or more standard lengths.

The modular leg and cross-bar units can be used to construct a work table 1 as shown in FIGS. 1 and 2. Four tubular legs 3 are provided, one for each corner of the table 1. An upper set of four cross-bars 37 are provided, one short pair 37a and one long pair 37b. One tab of a short and a long cross-bar 37a, 37b is hooked into each leg 3 through slots 25 and the tabs are retained in place with the locking means 53 associated with each leg. The cross-bars 37a, 37b extend from each leg 3 at right angles to each other, the long cross-bars 37b extending the length of the table and the short cross-bars 37a extending the width of the table.

A lower set of cross-bars 37' comprising a short pair 37a' and a long pair 37b' hook into the bottom slots 31 in the legs 3 to provide additional support to the table. No locking means are needed for these lower cross-bars.

Preferably, the cross-bars 37 are mounted to have the channel opening inwardly of the table. Thus the cross-bars 37 are set in from the legs as shown in FIG. 1. This allows suitable facing material such as plywood sheet 75 (shown in dash lines) to be mounted between the legs 3 against the webs 39 of the cross-bars. Suitably located and spaced holes 77 are provided in the web 39 and flanges 41 of the cross-bars adjacent their ends for connecting facing material, table tops, tools, etc. to the work bench. Also, these apertures or holes permit fastening of corner pieces and/or housing members in such cases when additional reinforcing may be required.

The work bench can be easily lengthened in either direction by adding one or more pair of legs and cross-bars to one or both ends of the table. The additional cross-bars cooperate with the slots on the third wall of the existing pair of legs at the one or both ends.

Many other knockdown structures can be erected from the same or similar modular units described. As shown in FIGS. 13 to 15, a work bench 91 having a shelf 93 above the work area 95 could be made. Such a work bench employs a slightly modified modular leg unit. This modified leg 103 has an extension 105 above the normal open end 7 of the previous leg, above the upper slots 25. The extension 105, as shown in FIG. 14, is for the purpose of joining a second leg 3' (or 103') thereto. A short connecting tube 107 having a diameter equal to the width of the inside of the leg 103 is inserted in the extension 105 of leg 103 to rest on the retainer 55 of the locking means 53. The tube 107 projects out of the upper end 109 of leg 103. The second leg 3', identical to leg 3 is now mounted on top of leg 103 over tube 107, its bottom end 111 resting on the top end 109 of leg 103. Standard cantilevered shelf supports 113 may be mounted in the slots 25 in the extension leg 3' to support the shelf 93 from the extension legs. The extension legs 3' are joined together by cross-bars (not shown). The modified legs 103 can be used to build high storage racks, placing sets of legs one on top of the other.

The cross-bars 37 can be made in several parts if desired. This is helpful when it is desired to add more cross-bars without disturbing the existing structure as in the case of shelving. As shown in FIGS. 11 and 12 for example, the notched tabs 43' can be formed from plates 121 bolted onto standard channel members 123 by bolts 125. The main body 127 of the plate 121 is fastened flat against the web 129 of channel 123. The tab 43' of plate 121 projects past the end 131 of channel 123 when plate 121 is fastened to the channel.

The locking means 53 can be slightly modified to more securely clamp the cross-bars 37 and legs 3 together. As shown in FIG. 16 the circular retainer 55' can be provided with a circular rib 135 projecting from one end face 137 of the retainer 55'. The tab 43'' on the cross-bars 37' are also modified to provide a second notch 139 in the other side 71' of the tab, opposite side 49'. This second notch 139 is shaped to snugly receive raised rib 135 when the cross-bar is fully inserted into leg 3 and when the locking means are fully employed. Retainer 55' is placed within the leg 3 with its end face 137 against the tab 43" so rib 135 can fit snugly into the notch 139. When the locking means are tightened, the cross-bar is securely held in place.

The modular leg and cross-bar units, being of square cross-section and deep channel cross-section respectively, are very strong thus providing very strong structures when assembled. Yet structures can be easily erected from these units without the aid of expensive tools or equipment.

I claim:

1. A construction for use in knockdown structures comprising: a tubular leg with (an anchor) a plug member (fixed) fixedly secured within the leg near one end of the leg by a portion of said leg, one longitudinal slot provided in the wall of the leg, the slot located between the (anchor) plug member and the one end of the tube and spaced from the (anchor) plug member; an elongated cross-bar having a tab extending from at least one end of the bar, the tab having a notch formed on one side of the tab adjacent the end of the bar; the cross-bar connected to the leg by sliding the tab through the slot until the end of the bar abuts the wall of the leg and then moving the cross-bar in a direction away from the one end of the leg to move the wall of the leg into the notch in the tab to prevent withdrawal of the cross-bar; and locking means to prevent the cross-bar from being moved in a directon back toward the one end of the leg, the locking means sized to fit within the one end of the leg and to attach to the (anchor) plug member while overlying the tab of the cross-bar to prevent its movement toward the one end of the leg (.) and comprising a retaining member for overlying the tab and internal adjustable bolt means for connecting the retaining member and the plug member to urge the members together and prevent the movement of the tab.

2. A construction as claimed in claim 1 wherein the tubular leg has a square cross-section, and a slot is provided in at least three of the walls at the same distance from the one end of leg.

3. A construction as claimed in claim 2 wherein each cross-bar has a channel cross-section with the web being relatively deep compared to the width of the flanges.

4. A construction as claimed in claim 3 wherein the tab is integral with the web.

5. A construction as claimed in claim 3 wherein the tab is attached to the web.

6. A construction for use in knockdown structures comprising: a tubular leg of rectangular cross-section with an anchor member fixed within the leg near one end of the leg and at least three longitudinal slots provided in the walls of the leg at the same distance from the end of the leg, said anchor member comprising a cylindrical plug inserted into the tubular leg, the plug being held in place within the leg by indenting the walls of the leg adjacent the plug to pinch the walls against the plug and provide interior locking tabs, the slots being located between the anchor member and the one end of the tube and spaced from the anchor member; an elongated cross-bar having a notch formed on one side of a tab adjacent the end of the bar; the cross-bar connected to the leg by sliding the tab through the slot until the end of the bar abuts the wall of the leg and then moving the cross-bar in a direction away from the one end of the leg to move the wall of the leg into the notch in the tab to prevent withdrawal of the cross-bar; and locking means to prevent the cross-bar from being moved in a direction back toward the one end of the leg, the locking means sized to fit within the one end of the leg and to attach to the anchor member while overlying the tab of the cross-bar to prevent its movement toward the one end of the leg.

7. A construction as claimed in claim 6 wherein the locking means comprises a retaining member for overlying the tab and a bolt for detachably connecting the retaining member to the anchor member.

8. A construction for use in knockdown structures comprising: a first tubular leg and a second tubular leg, said first tubular leg having an anchor member fixed within the leg near one end of the leg and at least one longitudinal slot provided in the wall of the leg, the slot located between the anchor member and the one end of the tube and spaced from the anchor member; said second tubular leg having an integral extension at the one end, and means to connect the first leg onto the extension of the second leg; an elongated cross-bar having a tab extending from at least one end of the bar, the tab having a notch formed on one side of the tab adjacent the end of the bar; the cross-bar connected to the leg by sliding the tab through the slot until the end of the bar abuts the wall of the leg and then moving the cross-bar in a direction away from the one end of the leg to move the wall of the leg into the notch in the tab to prevent withdrawal of the cross-bar; and locking means to prevent the cross-bar from being moved in a direction back toward the one end of the leg, the locking means sized to fit within the one end of the leg and to attach to the anchor member while overlying the tab of the cross-bar to prevent its movement toward the one end of the leg.

9. A construction for use in knockdown structures comprising: a tubular leg with an anchor member fixed within the leg near one end of the leg and at least one longitudinal slot provided in the wall of the leg, the slot located between the anchor member and the one end of the tube and spaced from the anchor member; an elongated cross-bar having a tab extending from at least one end of the bar, the tab having a notch formed on one side of the tab adjacent the end of the bar; the cross-bar connected to the leg by sliding the tab through the slot until the end of the bar abuts the wall of the leg and then moving the cross-bar in a direction away from the one end of the leg to move the wall of the leg into the notch in the tab to prevent withdrawal of the cross-bar; and a locking means having a retaining member comprising a circular ring having a raised circular rib projecting from one end of the ring; a second notch on the other side of the tab for receiving the rib on the ring when the cross-bar is connected to the leg and the locking means is employed to prevent the cross-bar from being moved in a direction back toward the one end of the leg, the retaining member being sized to fit within the one end of the leg and to attach to the anchor member while overlying the tab of the cross-bar to prevent its movement toward the one end of the leg, said retaining member having bolt means for detachably connecting the retaining member to the anchor member.

* * * * *